US011913676B2

(12) United States Patent
Walz et al.

(10) Patent No.: US 11,913,676 B2
(45) Date of Patent: Feb. 27, 2024

(54) PTC HEATING ELEMENT AND ELECTRIC HEATING DEVICE WITH SUCH A PTC HEATING ELEMENT AND METHOD FOR THE PRODUCTION OF A PTC HEATING ELEMENT

(71) Applicant: Eberspächer catem GmbH & Co. KG, Herxheim (DE)

(72) Inventors: Kurt Walz, Hagenbach (DE); Michael Niederer, Kapellen-Drusweiler (DE); Rüdiger Freitag, Landau (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 491 days.

(21) Appl. No.: 16/856,724

(22) Filed: Apr. 23, 2020

(65) Prior Publication Data

US 2020/0340708 A1 Oct. 29, 2020

(30) Foreign Application Priority Data

Apr. 24, 2019 (DE) ........................ 102019205848.5

(51) Int. Cl.
*F24H 1/12* (2022.01)
*H05B 3/50* (2006.01)

(52) U.S. Cl.
CPC ............... *F24H 1/121* (2013.01); *H05B 3/50* (2013.01); *H05B 2203/02* (2013.01); *H05B 2203/021* (2013.01)

(58) Field of Classification Search
CPC H05B 3/50; H05B 2203/02; H05B 2203/021; F24H 1/121
See application file for complete search history.

(56) References Cited

U.S. PATENT DOCUMENTS 4,147,927 A 4/1979 Pirotte
7,676,144 B2 * 3/2010 Zeyen .................. F24H 3/0435 219/520

(Continued)

FOREIGN PATENT DOCUMENTS

DE 10258257 7/2003
DE 102017209990 12/2018

(Continued)

*Primary Examiner* — Justin C Dodson
(74) *Attorney, Agent, or Firm* — Boyle Fredrickson S.C.

(57) ABSTRACT

A PTC heating element has a casing that joins as a unit at least one PTC element, conductor paths electrically connected to the PTC element, and insulating layers bearing, in a heat-conductive manner against the PTC element. The PTC heating element also has contact strips which project over itself and which are electrically conductively connected to the conductor paths for energizing the PTC element with different polarities. The casing forms a receptacle space that receives the PTC element, the conductor paths, and the insulating layers. In order to improve heat decoupling from the PTC element, the receptacle, in a cross-sectional view, is defined by two oppositely disposed inner surfaces covering the PTC element and concave cavities, adjoining the inner surfaces and forming the longitudinal edges of the casing, the diameter of which is greater than the distance between the inner surfaces. The electric heating device has at least one PTC heating element arranged in a circulation chamber. Also disclosed is a method in which the casing is first formed, the PTC element, the conductor paths and the insulating layers are then introduced through an opening of the casing into the receptacle space, and the casing then is deformed by deforming forces acting upon edge regions of the casing, so that oppositely disposed inner surfaces of the casing are abutted against the insulating layers.

13 Claims, 6 Drawing Sheets

(56) References Cited

U.S. PATENT DOCUMENTS

| | | | | |
|---|---|---|---|---|
| 7,977,610 | B2 * | 7/2011 | Hamburger | H05B 3/141 219/541 |
| 8,084,721 | B2 | 12/2011 | Mori et al. | |
| 9,915,441 | B2 * | 3/2018 | Kohl | F24H 9/1872 |
| 2008/0099464 | A1 * | 5/2008 | Niederer | F24H 3/0429 219/520 |
| 2009/0026194 | A1 * | 1/2009 | Bohlender | F24H 3/0429 219/532 |
| 2009/0107985 | A1 * | 4/2009 | Mori | H05B 3/50 219/534 |
| 2011/0240631 | A1 * | 10/2011 | Luppold | H05B 3/50 219/530 |
| 2017/0295613 | A1 * | 10/2017 | Kim | B60H 1/00392 |
| 2018/0015805 | A1 * | 1/2018 | Gschwind | B60H 1/14 |
| 2018/0065447 | A1 | 3/2018 | Cmelik et al. | |
| 2018/0156494 | A1 * | 6/2018 | Bohlender | F24H 9/1872 |

FOREIGN PATENT DOCUMENTS

| | | |
|---|---|---|
| EP | 1545157 | 6/2005 |
| EP | 2190256 | 5/2010 |
| EP | 2428746 | 3/2012 |
| EP | 2724086 | 4/2014 |
| EP | 3334242 | 6/2018 |
| WO | 2019086801 | 5/2019 |

* cited by examiner

PTC HEATING ELEMENT AND ELECTRIC HEATING DEVICE WITH SUCH A PTC HEATING ELEMENT AND METHOD FOR THE PRODUCTION OF A PTC HEATING ELEMENT

BACKGROUND OF THE INVENTION

1. Field of the Invention

The present invention relates to a PTC heating element for an electric heating device. The PTC heating element according to the invention has a casing that joins at least one PTC element, conductor paths electrically connected to the PTC element, and insulating layers bearing in a heat-conductive manner against the PTC element as a unit and has contact strips projecting over itself which are electrically conductively connected to the conductor paths for energizing the PTC element with different polarities.

2. Discussion of the Related Art

Such a PTC heating element is known, for example, from EP 2 190 256 A1. This PTC heating element has a frame comprising frame openings penetrating the frame in each one of which at least one PTC element is received which is provided on both sides with contact plates forming the conductor paths. An insulating layer bears against the side opposite the PTC element. These elements are overmolded with adhesive, whereby the components of the PTC element conducting the power current are to be sealed against the outer side of the PTC heating element.

A similar, elongate PTC heating element is disclosed by EP 2 724 086 B1, in which the previously mentioned components forming a heating cell, namely the PTC element and the conductor paths in the form of contact plates bearing thereagainst on both sides and an insulating layer provided therebetween are received in a flat tube.

These two previously known proposals for a PTC heating element have the drawback that the tubes need to be closed on one side, whereby the PTC heating elements increase in length more than necessary. Such casings formed as rectangular, round or oval tubes are typically closed at the end by laser or electron welding. This additional process makes the production of the PTC element more expensive.

In addition, the solution previously known from EP 2 190 256 A1 requires a plurality of parts in order to seal the PTC element and the current-conducting conductor paths against the environment. Leaks can arise at the phase boundaries between the individual components, which endangers electrical safety.

The same applies to the solution known from EP 2 428 746 A1, in which the PTC element is received in a tubular piece of sheet metal which is formed by a sheet metal profile closed at the face side. The proposed bead of the ends of the sheet metal that in a cross-sectional view of the PTC heating element are free as proposed for this cannot guarantee the necessary seal either.

With DE 10 2017 209 990 A1, the present applicant has proposed a PTC heating element of the type mentioned above, in which the current-conducting components are arranged and sealed in ceramic shells. Here as well, leaks can arise at the joint between the two shell elements. The production of the previously known PTC heating element is also relatively complex.

The same applies to the solution previously known from EP 3 334 242 A1, in which the PTC element and the contact plates that bear electrically conductively bear thereagainst as conductor paths together with an insulation provided on the outer side are overmolded with a plastic frame leaving the insulation exposed. In addition to the complex production, this solution has the drawback that the medium to be heated can reach the current-conducting components between the frame and the surface of the insulating layer. A complete seal of the current-conducting components within the casing requires particularly precise process control and inspection of the manufactured PTC heating elements.

SUMMARY

The present invention is based on the object of specifying a PTC heating element of the type above which can be produced inexpensively and allows for good heat delivery of the heat generated by the PTC element.

To satisfy this object, a casing is proposed with the present invention which forms a receptacle space which is adapted to receive the PTC element, the conductor paths, and the insulating layers. This receptacle space is formed by the casing, preferably by a deep drawn part, where the deep drawn part is already closed at the underside after deformation processing in the context of deep drawing. The casing or the deep drawn part, respectively, has a pot-shaped configuration closed at the underside and is only open on one side. On this side, the contact strips project over the casing so that the PTC element can be electrically connected at this side.

Insofar as the description of the present invention gears toward deep drawing, this is also synonymously to be understood to be extrusion. The casing may be produced from sheet metal by deformation. A die and a punch may act together, where the punch forces the sheet metal material ahead by penetrating it. The sheet metal material is diverted from the die and follows the motion of the punch. At the end, a pot-shaped component is obtained which is closed on the underside. The component consists of metallic sheet metal, so that the walls defining the reception space are made of a material having good thermal conductivity. The sheet metal can be, for example, copper sheet metal or an aluminum sheet metal. The housing may be is formed from a cylindrical profile closed on one side, initially produced as a continuous material. The housing may be made of Al 99.5 or aluminum with a low Si content, whereby the low Si content should not exceed 5% by weight.

According to the invention, the receptacle space is in a cross-sectional view defined by two oppositely disposed flat inner surfaces and cavities which inner surfaces are regularly aligned in parallel to each other and covering the PTC element which adjoining the inner surfaces. These cavities are defined on the outer side by outer longitudinal edges of the casing extending in the height direction of the PTC element. Provided between these outer longitudinal edges and the flat inner surfaces are deformation segments that are plastically deformable in the direction toward the receptacle space. The deformation segments are plastically deformed in relation to the inner surfaces and possibly the longitudinal edges. The deformation segments are then plastically deformed in relation to the inner surfaces and preferably the longitudinal edges. The deformation segments generally adjoin the inner surface directly. In a cross-sectional view, the deformation segments are located at the edge region of the receptacle space and therefore of the casing, but within the outer longitudinal edge. Due to the plastic deformation, the inner surfaces bear against the PTC element under resilient prestress and with the interposition of the insulating layer and the conductor path.

The cavities may be concave on the outside, for example, formed to be polygonal, oval or in the shape of shape of a segment of a circle, and have a diameter which is greater than the distance between the inner surfaces. This requirement pertains to the finished product as well as the casing prior to deformation in which the inner surfaces initially leaving free a free space for the insertion of the insulating layer together with the conductor paths and the PTC element are moved toward each other in order to abut them under prestress against the outer surfaces of the insulating layer. The PTC element or elements in the receptacle space are covered by the inner surfaces. The inner surface of the casing then covers the main side surface of the PTC element and may be only slightly project thereover. The special configuration of the receptacle space facilitates the resilient abutment of the inner surfaces against the outer surfaces of the insulating layers.

Because with the method according to the invention, the deformation takes place in the region of the cavities, i.e. by a deformation force acting exclusively against the longitudinal edges of the casing. The diameter, however, is not necessarily only to be understood to be the inner dimension of a cavity which in cross-section has the shape of a segment of a circle. The cavity can also have other configurations. It can have an oval or polygonal cross-sectional shape. It is most important that the dimension of the cavity in the direction of the spacing between the inner surfaces is greater than this distance and that the outer surface of the cavity or the deformation segments, respectively, project over the outer surface of the casing where the casing is to bear with its inner surface against the insulating layer Because a deformation tool acting against the edge regions of the casing engages at this outer surface of the casing and makes the inner surfaces bear against the insulating layers with a certain prestress The insulating layer may comprise a layer of an elastomer or silicone. The thickness of the insulating layer should be a few tenths of a millimeter. E.g. 1/10 to 3/10 mm. The insulating layer should have certain damping properties in order to compensate for local stress when the housing is pressed so that the PTC element does not break. The insulating layer can be a ceramic plate, especially an $Al_2O_3$ plate, possibly as a further layer in combination with the above-mentioned plastic layer and, if necessary, an adhesive layer.

The casing may comprise at least one reinforcement that is may be formed by the deep drawn part and that holds at least two of PTC element, conductor path, and insulating layer in a prestressed manner in abutment against each other in the casing. The PTC element, the conductor paths and the insulating layers provided on the outer side are typically received as parallel layers in the receptacle space. The insulating layers can be formed integrally, for example, by folding over a film that connects two insulating layers to each other by way of a lower fold. Lower is presently understood to be that region of the PTC element that is provided close to the closed end of the deep drawn part. The closed end is regularly the end that during deep drawing is in the direction of motion provided in front of the punch.

The reinforcement of the casing may be provided in the region of the outer longitudinal edges and/or in the region of the inner surfaces. In contrast, the deformation segments in which the plastic deformation takes place are formed to be less strong. The reinforcement can be formed by shaping and/or thicker walls. The aforementioned spherical configuration is one type of reinforcement of the casing in the region of the outer longitudinal edges.

The reinforcement on the casing can be formed by a stiffening rib producing by deep drawing or a spherical configuration of oppositely disposed main side walls of the casing or parts of these walls. This spherical configuration is evident on the outer side of the casing, whereas the corresponding inner surfaces are plane-parallel and bear against the insulating layers. With a spherical configuration, the inner surface is flat and extends parallel to a main side surface of the PTC element, whereas the outer side of the casing disposed opposite to the main side surface is formed to be convex. Accordingly, in a cross-sectional view, the casing has a greater thickness in the center of the inner surface than at the edge of the inner surface.

In a cross-sectional view, the thickness ratio between the largest and smallest wall thickness the of housing should be between 3/1 and 5/1. In one configuration, the smallest wall thickness should not exceed 1 mm.

In any case, the present invention proposes to improve or guarantee the close abutment of the PTC element, the conductor paths and the insulating layers, which is preferable for good heat decoupling, by way of a prestressing force delivered by the casing. Of course, the parts previously mentioned can first be adhesively bonded together as part of a pre-assembly. The adhesive bonding between the PTC element and the conductor paths is there typically cured under pressure, so that these layers are held bearing against each other as close as possible until the adhesive has cured. The same applies to the insulating layers. It is then certainly achieved by the prestress that the casing bears under prestress on the outer side against the insulating layer, where the prestress is passed on at the phase boundary to the conductor path and/or the PTC element even with prior adhesive bonding.

The conductor path can be electrically in contact and connected to the main side surface of the PTC element. The conductor path can be an end-to-end metal sheet. The conductor path can also be formed by a metal structure penetrated by through holes, for example, a metal mesh, stretch metal, or metal fabric. The conductor paths can be bearing electrically conductively entirely or in part against face side surfaces of the PTC element. In this case, the main side surfaces of the PTC element are usually hardly or not at all provided with the conductor path. Heat decoupling via the main side surface then does not have to take place through the conductor path.

The main side surface of the PTC element is typically understood to be the largest surface of the PTC element. PTC elements are usually cuboid or plate-shaped. An edge running around the main side surfaces typically has a height of less than one-tenth of the length or respective width of the PTC element, where the width and the length define the main side surface.

According to one preferred further development of the present invention, the PTC heating element according to the invention has a ground connection strip that is electrically connected to the casing. This ground connection strip can project from the casing in a direction parallel to the direction of extension of the contact strips. The ground connection strip is used for electrically connecting the casing to an earth terminal. Furthermore, the casing can comprise a holding rib disposed opposite to the contact strips. In the case of a casing formed as a deep drawn part, this holding rib is typically formed by the deep drawing. The casing then does not require any post-processing to form the respective holding rib after deep drawing. The holding rib is typically provided to position the casing in a heating casing which for this purpose comprises on its bow a receptacle formed adapted to receive the holding rib, as this is basically known from EP 3 334 242 A1 as another example of a PTC heating element. Provided that the heater casing has electrically conductive properties or at least forms an electrically conductive base, an electrical connection of the sheet metal casing of the PTC heating element according to the invention can be established via the holding rib. The PTC heating element with its casing is then connected to ground via the base of the heater casing.

According to one preferred further development of the present invention, the PTC heating element according to the invention comprises a seal element made of resiliently soft plastic material which seals an opening of the casing, where the contact strips project thereover. This seal is typically formed as a labyrinth seal. This seal element consists, for example, of resiliently soft plastic material such as silicone or TPE.

The casing typically forms a collar which is surrounded circumferentially by a labyrinth seal of the seal element. This collar leads to a certain stiffening in the region of the seal, so that the seal element can be inserted with good pressing force into a female plug contact holding fixture of a heater casing which provides a connection chamber for the electrical connection of the PTC element and a circulation chamber which are separated from each other in a fluid tight manner by way of a partition wall of the heater casing. This results in a good tightness in the region of the female plug element holding fixture. In addition, the PTC heating element can be positioned in the partition wall by way of the plug contact and held there at least temporarily for installation purposes.

With regard to tolerance compensation and for improved sealing within the female plug contact holding fixture, it is proposed according to a preferred embodiment of the present invention that the seal element projects over the casing in the direction of longitudinal extension of the contact strips. When plugged into the female plug element holding fixture of the heater casing, the seal element can accordingly be compressed in the plug-in direction, so that the seal element expands in the female plug element holding fixture and fills it as completely as possible, which improves leak tightness.

The casing according to a preferred further development of the present invention comprises a holding edge, in particular, for the abutment of this compression motion of the seal element. The seal element bears against to this holding edge. The holding edge is typically formed by the deep drawn part itself and therefore the result of a deformation of the sheet metal material when the casing is deep drawn.

The PCT heating element may have a passage segment made of electrically insulating material which is inserted in the manner of a plug into a free end of the deep drawn part penetrated by the contact strips and forms passage channels for the contact strips. This passage segment provides the contact strips with lateral guidance in the region in which they are extended beyond the casing. In addition, the passage segment prevents direct electrical contact between the contact strips and the casing made of sheet metal, so that the insulation of the electrically conductive casing is not compromised. The passage segment may be formed integrally with a frame that surrounds the PTC element at least in part, usually entirely. The frame typically forms a receptacle opening for the at least one PTC element and is formed by the frame ties fully surrounding the PTC element, which are typically arranged as thin webs between the PTC element and the inner wall of the deep drawn part.

The passage segment can be formed integrally with the previously mentioned frames and form half shells for guiding the contact strips, in which, after placement of a passage segment lid completing the passage segment, the contact strips are guided, retained and received in an insulated manner. The connection between the frame and the passage segment lid is typically established by staking pins which penetrate bores that are recessed in the contact strips, so that also the contact strips and the conductor paths attached thereto are pre-positioned. The conductor paths may be formed from sheet metal as contact plates. At their lower end, they typically comprise positive-fit elements which are formed from the sheet metal material by punching and bending and are in engagement with receptacles formed by the frame, in particular by the cross tie member of the frame. A pre-assembled component assembly can thus be created by the frame which joins the frame, the passage segment, as well as the two contact plates and the PTC element or elements provided therebetween to form a unit. The passage segment there consists of the passage segment provided on the frame side and the passage segment lid.

According to its independent claim, the present invention proposes an electric heating device with at least one PTC element of the type described above arranged in a circulation chamber, where the contact strips projecting from the casing protrude through a partition wall into a connection chamber of a heater casing in which the contact strips are connected to a current source for energizing the PTC element with different polarities. The partition wall of the heater casing forms a female plug contact holding fixture, in which the PTC element is typically inserted in a sealed manner, possibly by way of the seal element retained in a frictionally engaged manner at least for assembly purposes.

With its further independent aspect, the present invention proposes a method for the production of a PTC heating element of the type mentioned above. In this method, the PTC element, the conductor paths, and the insulating layer are introduced through an opening formed by the casing into a receiving chamber of the casing. The casing may have been previously formed as a deep drawn part. The direction with which the punch drives the sheet metal material ahead corresponds to the direction of the introduction of the aforementioned elements into the receptacle space. By deep drawing, only one opening to the receptacle space is formed. The deep drawn part is closed opposite to the opening, since only the deformed sheet metal is provided on that side.

In a further method step, the casing is finally deformed by circumferential forces acting solely on edge regions of the casing, so that oppositely disposed inner surfaces of the casing are abutted against the components introduced into the receptacle space, i.e. the PTC element, the conductor paths, and/or the insulating layer. The insulating layer itself formed as one or more layers typically assumes the function of interacting directly with the inner surfaces of the casing, i.e. bear thereagainst. These inner surfaces are typically parallel to the main side surfaces of the PTC element.

The forming forces act exclusively upon those regions of the deep drawn part which lie as an edge outside a projection surface of the main side surfaces of the PTC element on the inner surface of the casing. The forming forces accordingly do not act directly against the main side surfaces of the PTC element and the layers bearing thereagainst, for example, the insulating layers. This achieves a gentle deformation of the casing. In addition, the material of the casing can be deformed between the lateral edges, which during the preferred deep drawing typically extend parallel to the direction of motion of the punch, and the layers provided in the receptacle space, so that a certain prestress, with which the inner surfaces bear against the layers introduced into the receptacle space, can be obtained by the outer convex curvature of the edge regions. For this purpose, it is preferable to arrange a frame, which is made of insulting material, in particular plastic material, and receives the PTC element, with its longitudinal tie members directly adjacent to the edges of the deep drawn part and to provide between these longitudinal tie members and the PTC element a clearance in which the sheet metal material of the casing is forced during the forming process. This clearance may be covered by the insulating layer which can abut as a plastic film above the PTC element or the conductor path, respectively, and at the same time at least in part cover the longitudinal tie members. This ensures that forming the casing does not lead to direct electrical contact of parts of the casing, for example, with the circumferential edge of the PTC element or a conductor path bearing thereagainst.

The forming process may be carried out in a die with an upper and a lower part which have forming surfaces that interact with the outer side of the deep drawn part outside the PTC element, i.e. as described above, laterally beside the PTC element.

The deep drawn part may be deformed in the die with a block pressing. In the context of this block pressing, at least the oppositely disposed longitudinal edges of the casing are framed in the direction of motion of the die on the upper as well as the lower side and also perpendicular thereto, i.e. at the edge. This prevents the metallic material of the deep drawn part from evading the forming movement toward the exterior. A deformation of the inwardly directed curvature of a typically convex-shaped longitudinal edge of the casing instead arises. Depending on the tolerances of the casing, but in particular of the components received in the receptacle space, the deformation can be more or less strong.

However, the process is set in such a way that pre-stressed abutment of the components of the PTC heating element received in the receptacle space is obtained by the forming motion.

BRIEF DESCRIPTION OF THE DRAWINGS

Further details and advantages of the present invention shall become apparent from the following description of an embodiment in combination with the drawing, in which.

DETAILED DESCRIPTION

Figure 1:
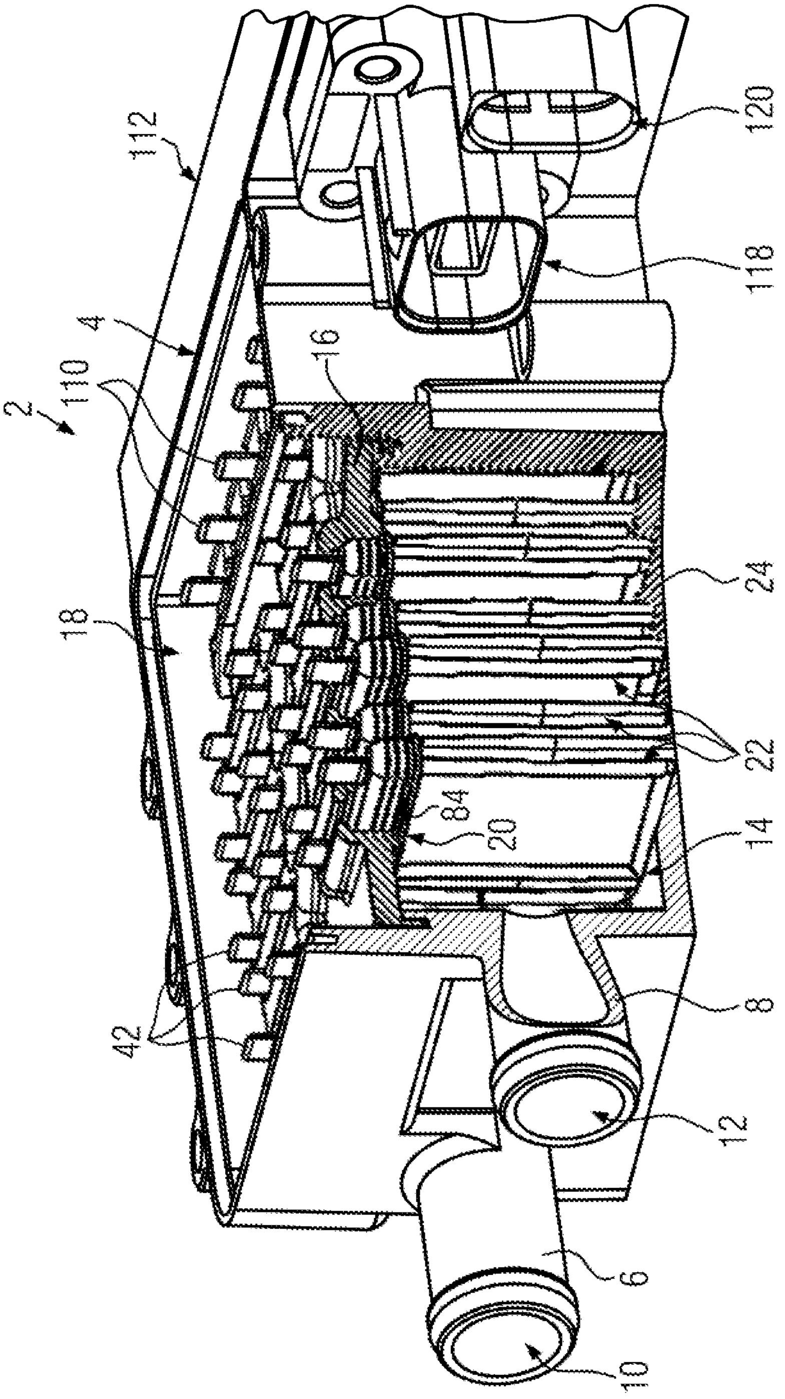
FIG. 1 shows a perspective side view of an embodiment of an electric heating device.

FIG. 1 shows a perspective top view onto a heater casing marked with reference numeral 2 of an electric heating device formed as a water heater. The heater casing 2 has a casing tub element 4 made of plastic material. The heater casing 2 forms an inlet port 6 and an outlet port 8 which are presently embodied formed integrally on the casing tub element 4. The ports 6, 8 are designed as hose connection ports and form an inlet opening 10 and an outlet opening 12, respectively, to a circulation chamber designated with reference numeral 14.

The circulation chamber 14 is separated from a connection chamber 18 and sealed thereagainst by a partition wall 16 made of plastic material. The partition wall 16 forms female plug element holding fixtures 20 for PTC heating elements 22 which are inserted into the female plug element holding fixtures 20 and supported on a base 24 of the casing tub element 4.

FIGS. 3 to 9 illustrate details of the PTC heating element 22 which presently comprises only one PTC element 30 which at its oppositely disposed main side surfaces 32 is covered with an insulating layer 34. The insulating layers 34 are presently formed from a plastic film, for example made of Kapton. The PTC element 30 is configured as a platelet having a width B or a length L, respectively, that is greater by the factor of at least 10 than a thickness that corresponds to the distance between the two main side surfaces 32.

Provided on oppositely disposed main side surfaces 32 are respective contact plates 38 which can be adhesively bonded to the PTC element 30 and thereby be connected in an electrically conductive manner to a surface metallization of the PTC element 30 which can be applied as a layer by way of PVD or CVD. The contact plates 38 can also only merely be placed onto the PTC element 30. Each contact plate 38 forms a contact surface 40 which is abutted in an electrically conductive manner against the main side surface 32 of the PTC element 30, a contact strip 42 projecting on one side above the PTC element 30, and a snap-on spade 44 projecting at the opposite side, hereafter referred to as the underside. The contact surface 40 is presently provided coinciding with the main side surface 32 of the PTC element 30. The insulating layer 34 lies on the side facing away from the PTC element 30 on the contact plate 38 and covers the latter.

The PTC element 30 is received in a frame 46 which for this purpose comprises a frame opening 48 which is defined by longitudinal tie members 50 and cross tie members 52, 54. The lower cross tie member 54 has two locking openings 56 to accommodate the snap-on spades 44. The upper cross tie member 52 is formed integrally with a passage element base 58 which together with a passage segment lid 60 forms a kind of plug over which a stop collar 61 projects. Projecting over this stop collar 61 are half shells 62 which is formed by the frame 46 and from which pins 64 protrude. Corresponding thereto, the passage segment lid 60 comprises bores 66 and half shells 68 that are aligned with them.

For assembly, one of the contact plates 38 is first placed with its contact strip 44 into the half shell 62. The pin 64 is there passed through a bore recessed on the contact strip 44. The snap-on spade 44 of the contact plate 38 is introduced into the associated locking opening 56. Connected in this manner, the frame 46 has a base formed by the contact plate 38 onto which the PTC element 30 is placed. Thereafter, the further contact plate 38 is placed in the manner previously described into the other of the two half shells 62 and onto the main side surface 32 of the PTC element 30.

The passage segment lid 60 is mounted thereafter, so that the pins 64 are inserted into the bores 66 and the half shells 68 of the lid 60 complete the half shells 62 of the base 58. Thereafter, the respective contact strips 42 are received in an insulating manner in a passage channel 70 respectively formed by the half shells 62, 68 and extended beyond the frame 46 (compare FIG. 4). The pins 64 can then undergo staking to captively connect base 58 and lid 60 to each other.

The structural unit thus produced is covered with insulating layer 34. For this purpose, the plastic film forming the insulating layer 34 is folded over at the lower end of the frame around the lower cross tie member 54, so that parallel legs result which are each formed by the uniform film and form the insulating layers 34.

The unit thus produced is inserted into a casing 72 which is presently formed from sheet metal by deep drawing and provided with a single opening 74, where the region of casing 72 disposed opposite the opening 74 is closed and provided with a holding rib 76 which interacts in a receiving groove recessed on the base 24 of the heater casing 2 for positioning the PTC heating element 22 in the heater casing 2. The pre-assembled unit is introduced through the opening 74 into a receptacle space 78 of the deep drawn part 72. At the end of the insertion motion, the stop collar 61 abuts against the edge of the opening 74, thereby predetermining the mounting position of the frame 46 and thus of the components of the PTC heating element 22 held by the frame 46 and placed around the frame 46.

Below the opening 74, the deep drawn part 72 forms a holding edge 80 which circles circumferentially parallel to the edge of the opening 74 around the deep drawn part 72 and between itself and the opening 74 forms a collar 82 that forms a bearing surface for a seal element 84. The seal element 84 is made of a resiliently soft plastic material, for example TPE or silicone, and has passage openings 86 for the half shells, 62, 68 connected to each other. The seal element 84 can be produced separately and joined with the frame 46 and the deep drawn part 72. Alternatively, it is also possible to connect the seal element 84 by overmolding it with the frame 46 and the deep drawn part 72.

The seal element 84 is in any case supported on the holding edge 80 which is formed by the deep-drawn part 72 itself and shaped by deep drawing the sheet material. All contours and projections provided on the deep drawn part 72 are realized by the deep drawing and a result of the forming processing of the sheet metal. Only the opening 74 is formed by cutting off the excess sheet metal material and optional deburring.

Figure 4:
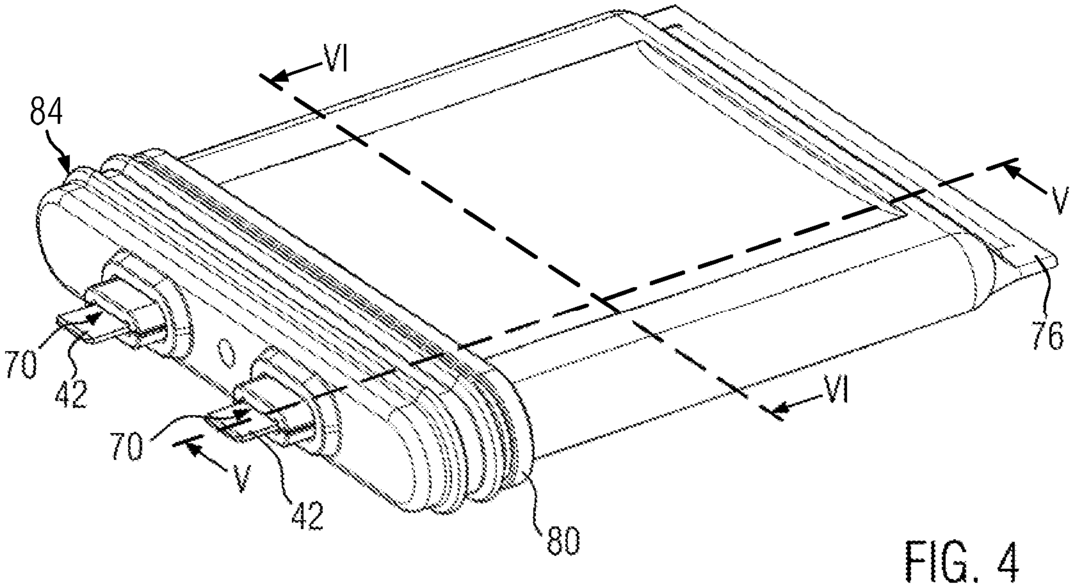
FIG. 4 shows a perspective side view of the embodiment of a PTC heating element illustrated in FIG. 3.

As FIG. 4 shows, the contact strips 42 project over the free ends of the joined half shells 62, 68 and can be used as male plug elements of a plug connection to the PTC heating element 22. Disposed at a distance to the face side of the joined half shells, 62, 68 is the seal element 84.

Figure 5:
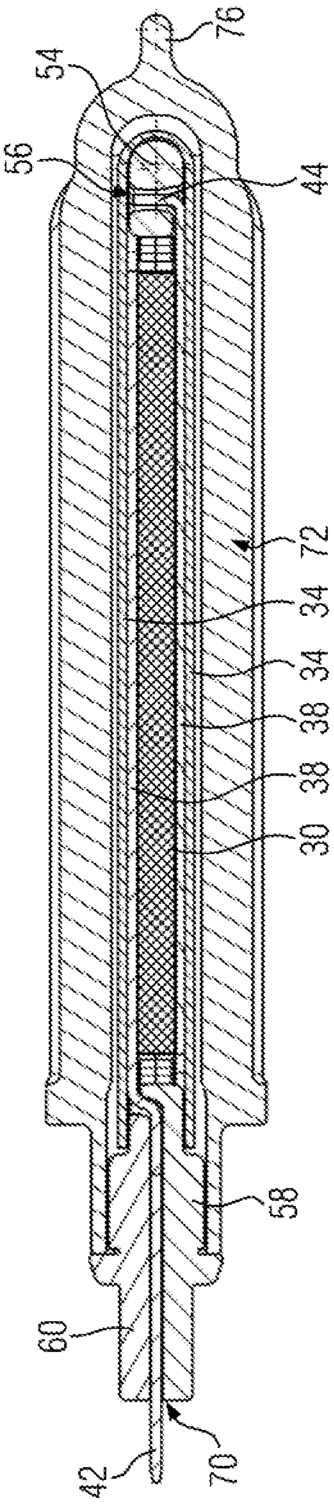
FIG. 5 shows a perspective longitudinal sectional view taken along line V-V according to the illustration in FIG. 4 before the PTC heating element is pressed together.
Figure 6:
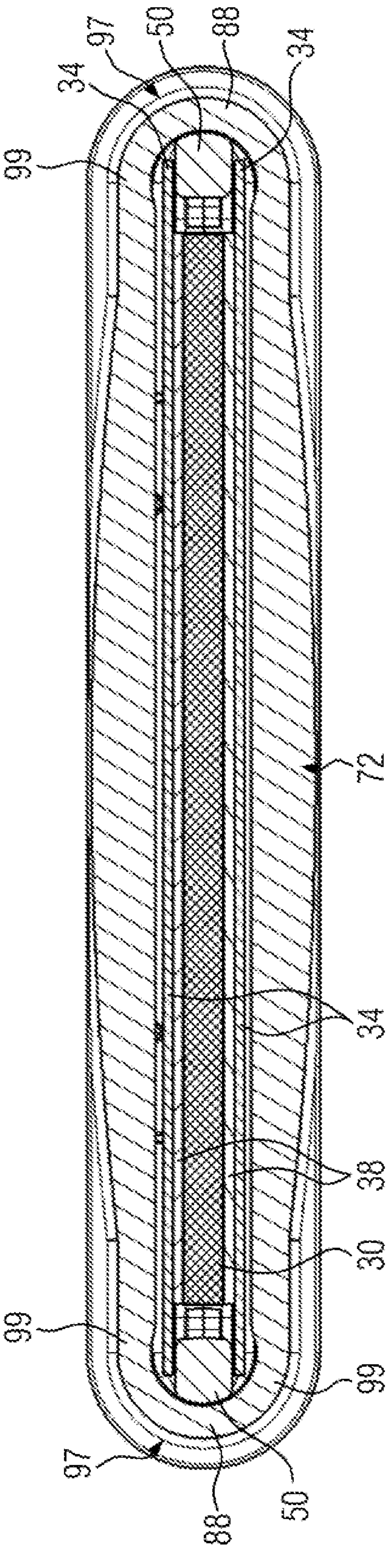
FIG. 6 shows a perspective cross-sectional view taken along line VI-VI according to the illustration in FIG. 4 before the PTC heating element is pressed together.

The economical introduction of the elements previously mentioned into the receptacle space 78 entails that the insulating layers 34 initially do not bear against the associated inner surfaces of the receptacle space 78 in a sufficiently heat-conductive manner, which FIGS. 5 and 6 illustrate. After the assembly of the components, the deep drawn part 72 is then deformed in the region of its longitudinal edges 88. The deep drawn part 72 is for this purpose introduced into a die 90 with upper part 92 and lower part 94 which are basically formed in an identical manner.

Figure 9:
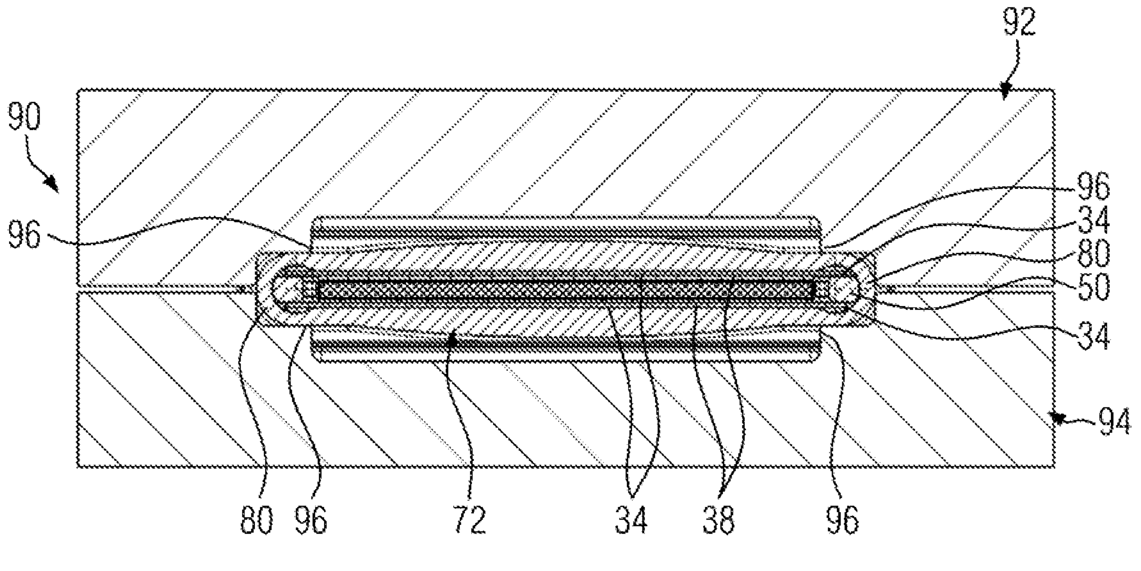
FIG. 9 shows a cross-sectional view of the embodiment of the PTC heating element according to FIGS. 3 to 8 when being pressed together in a die.

FIG. 9 indicates that the two parts 92, 94 each form a deformation edge 96 which is abutted against the outer surface of the deep drawn part 72. The point of attack of the deformation edge 96 in the sectional view is located sideways next to the transverse extension of the PTC element 30 and the associated contact plates 40. The deformation edge 96 engages in a free space which is left exposed between the associated longitudinal tie member 50 and the PTC element 30 or the contact surface 40, respectively, and is bridged only by the insulating layer 34 which at least in part projects over the respective longitudinal tie member 50.

The deep drawn part 72 is then deformed only in the region of its longitudinal edges 88. The curvature of the longitudinal edges 88 of the deep drawn part 72 produced by deep drawing and initially basically formed in a semicircular manner are bent more inwardly whereby the inner surfaces of the deep drawn part extending parallel to the main side surfaces 32 are abutted under prestress against the surfaces of the insulating layers 34.

The die 90 takes hold of the respective longitudinal edges 88 both in the direction of motion of the two parts 92, 94 toward each other, as well as at the outer side of the deep drawn part 72. The deep drawn part 72 inserted into the die 90 with its exterior outer sides defined by the longitudinal edges 88 contacts the die 90. The metallic material of the deep drawn part 72 can accordingly only be deformed in the direction toward the PTC element 30.

The deformation edge 96 does not act directly against the PTC element 30, so that damage thereto during the forming process is avoided to the extent possible. In addition, after the forming process, a resilient prestress arises, which results in reliable heat dissipation due to good heat conduction from the PTC element 30 through the contact plates 40 and the insulating layer 34 to the inner surface of the deep drawn part 62 and through the latter by way of heat conduction to the outside.

The deep drawn part 72 with its main side surface is evidently formed as a sphere. An inner surface 98 extends flush with the main side surface 32 of the PTC element 30, whereas the outer side of the deep drawn part 72 disposed opposite to the main side surface 32 is formed in a convex manner. Accordingly, in a cross-sectional view, the deep drawn part 72 has a greater thickness at the center of the inner surface 98 than at the edge of the inner surface 88. This configuration improves the prestress and strength of the deep drawn part 72 for applying an external pressing force of the elements of the PTC heating element 22 mounted in the receptacle space 78.

The flat inner surface 98 of the deep drawn part 72 respectively transitions at the edge to a cavity having essentially the shape of a segment of a circle. The deformation previously mentioned of the deep drawn part 72 takes place only in the region of this cavity. The C-shaped claw, still open in FIG. 6 and formed by the cavity, is more clearly seen clearly more closed after the forming processing and in FIG. 8. In other words, the diameter of each cavity of the deep drawn part 72 provided at the longitudinal edges of the deep drawn part 72 is reduced by forming processing, whereby the inner surfaces 98 disposed opposite to each are abutted toward each other and under prestress against the insulating layer 34.

Specifically, a deformation segment 99 is formed through the casing respectively between an outer longitudinal edge 97 and the inner surface 98. This deformation segment 99 is plastically deformed in the direction toward the receptacle space 78. Four such deformation segments 99 are provided in the embodiment shown. Two deformation segments 99 are provided between the inner surface 98 and the outer longitudinal edge 97 on the upper side as well as on the lower side according to FIG. 8. However, for the inner surfaces 98 bearing against the PTC element 30 in a prestressed manner, it is sufficient to provide and plastically deform the corresponding deformation segments 99, for example, only on the upper side in order to introduce an internal prestressing force into the casing. Where it is irrelevant whether the casing is produced by deep drawing or otherwise. When deforming the deformation segments 99, the outer longitudinal edge 97 presently remains undeformed.

Figure 7:
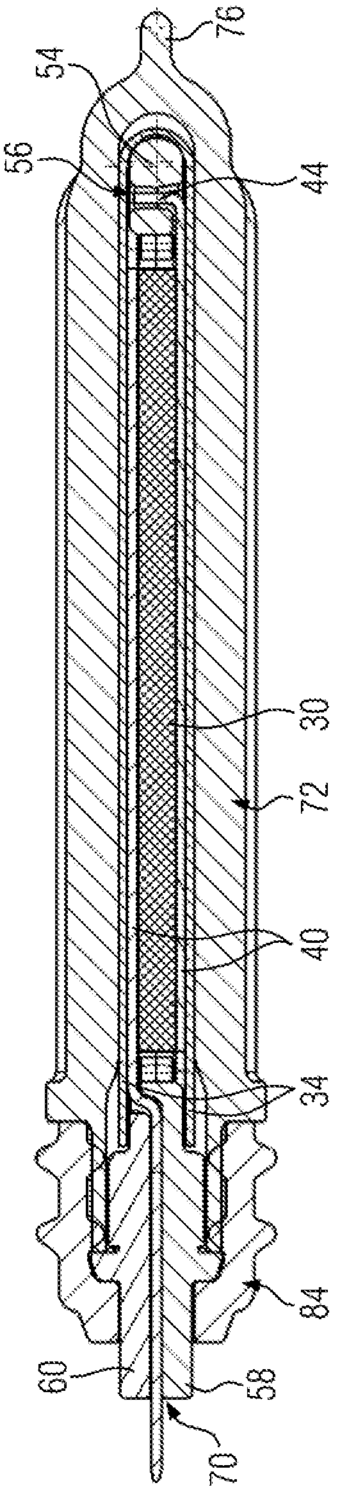
FIG. 7 shows a perspective longitudinal sectional view taken along line V-V according to the illustration in FIG. 4 after the PTC heating element has been pressed together.
Figure 8:
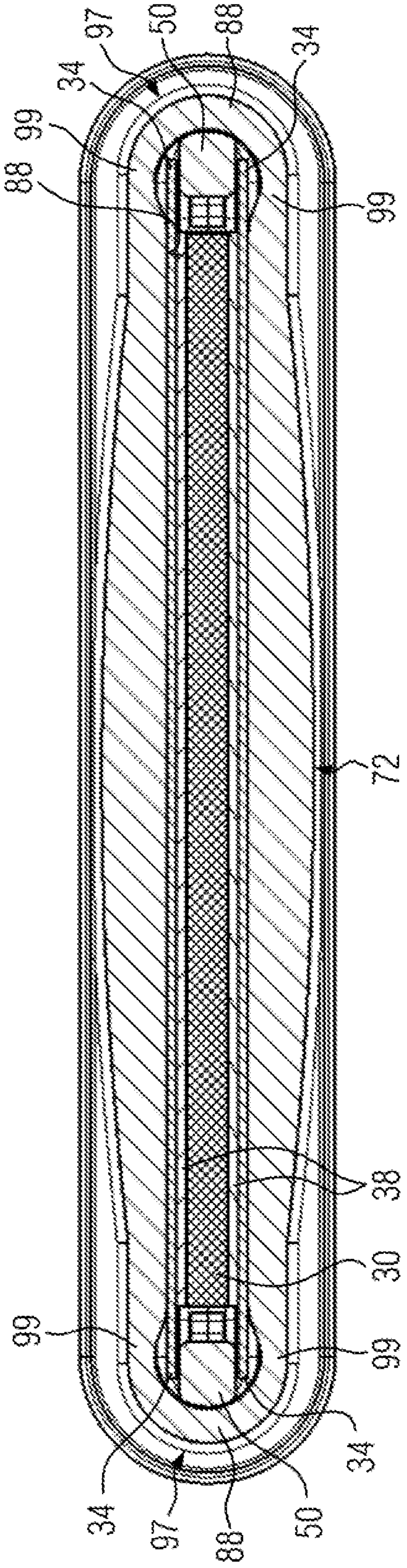
FIG. 8 shows a perspective cross-sectional view taken along line VI-VI according to the illustration in FIG. 4 after the PTC heating element has been pressed together.

As the comparison of FIGS. 5 and 6 with FIGS. 7 and 8 shows, the inner surface 98 of the deep drawn part 62 bears flush against the insulating layer 34 after the deformation according to FIG. 9.

Figure 2:
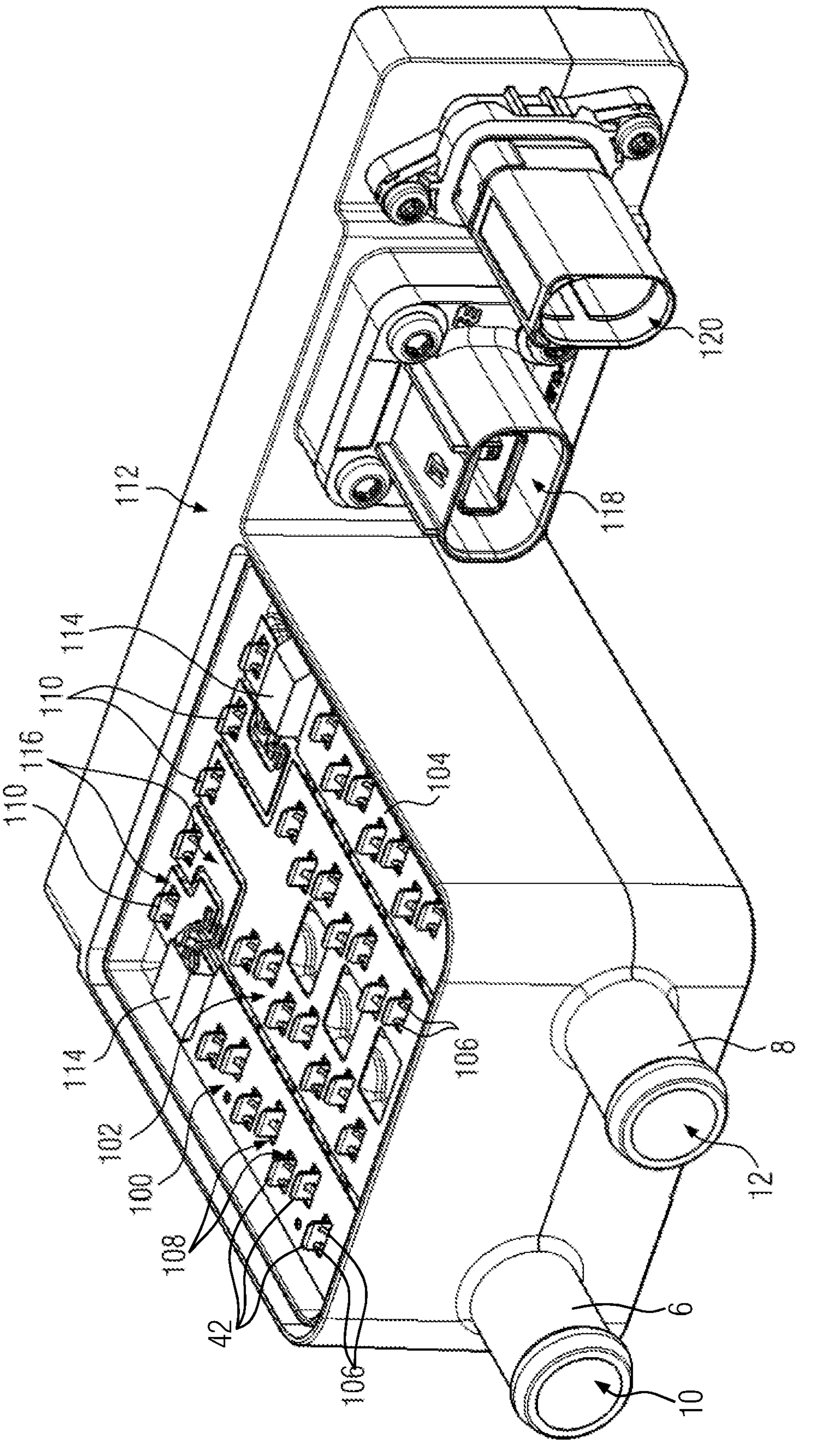
FIG. 2 shows a perspective side view of the embodiment according to FIG. 1 after connection of the PTC heating elements.
Figure 3:
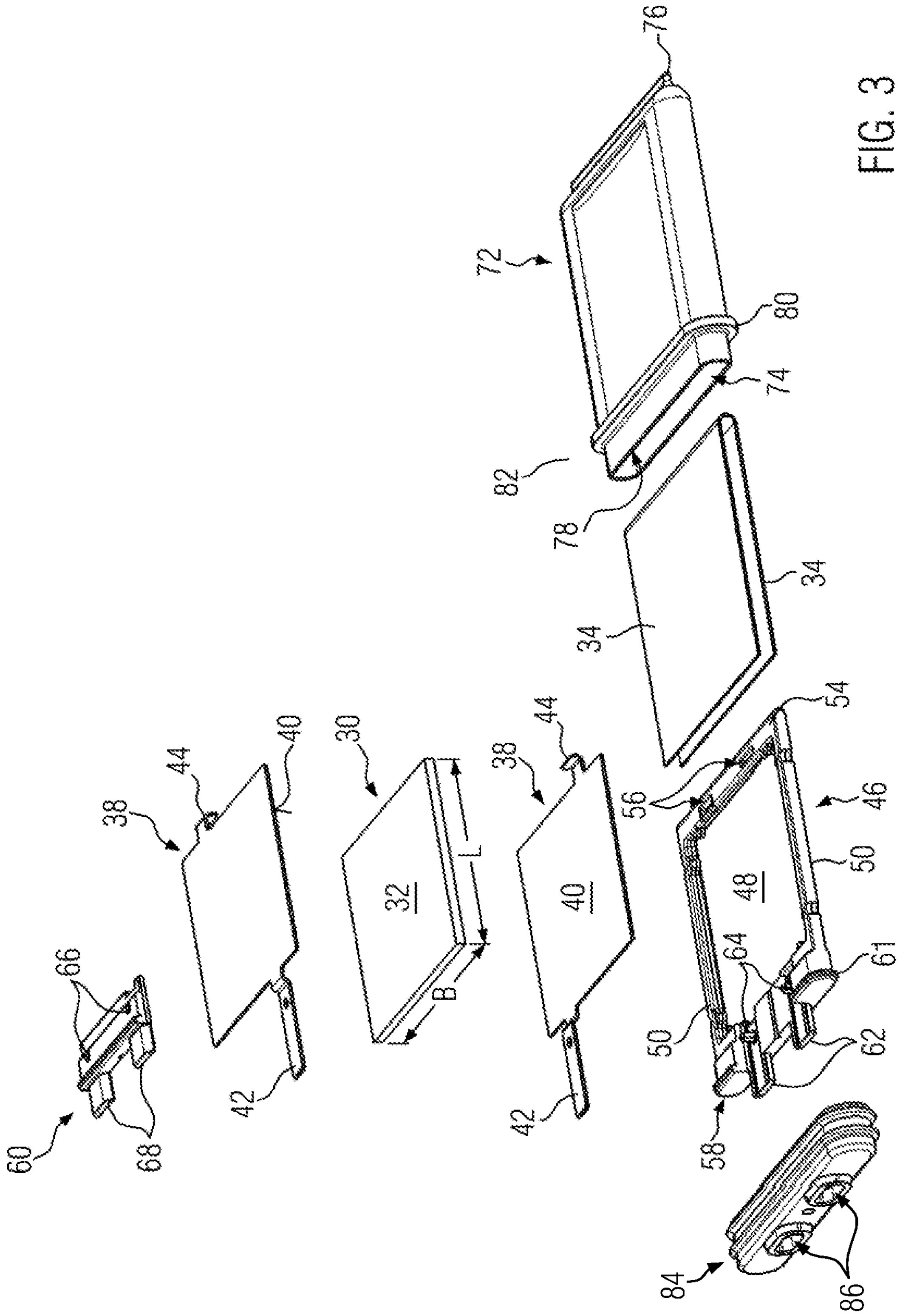
FIG. 3 shows a perspective explosion view of the PTC heating element of the electric heating device shown in FIGS. 1 and 2.

FIG. 2 illustrates the electrical connection of the PTC heating elements 22. For the electric connection, pieces of punched sheet metal are provided in the connection chamber 18 as current bars 100, 102, 104, comprising contact projections 106 formed by punching and bending which bear against the contact strips 42 subject to resilient prestress and contact them. The contact projections 106 project into receptacle openings 108 which are recessed in the sheet metal strips of the current bars 100, 102, 104. Connection strips marked with reference numeral 110 are connected in the same way and are contacted to a fitted circuit board which is accommodated in a control casing 112. The connection of the current bar 102 is established directly via the connection strip 110, whereas the connection of the current bars 100, 102 is established via a power transistor 114 which is contacted by punched conductors 116 which are electrically connected to the associated connection strips 110.

The invention claimed is:

1. A PTC heating element for an electric heating device, comprising:

a casing that joins, as a unit, at least one PTC element, conductor paths that are electrically connected to the PTC element, and insulating layers that bear against the PTC element in a heat-conductive manner; and contact strips which project over the PTC element and which are electrically conductively connected to the conductor paths for energizing the PTC element with different polarities, wherein the casing forms a receptacle space that receives the PTC element, the conductor paths, and the insulating layers, wherein the receptacle space, in a cross-sectional view, is defined by two oppositely disposed flat inner surfaces covering the PTC element, deformation segments adjoining the inner surfaces, and outer longitudinal edges of the casing, wherein the deformation segments are provided, in a cross-sectional view, between one of the inner surfaces and the associated outer longitudinal edge, and wherein the deformation segments are plastically deformed in a direction towards the receptacle space, opposite the inner surfaces and the outer longitudinal edges of the casing, and perpendicular to the flat inner surfaces of the receptacle space.

2. The PTC heating element according to claim 1, wherein the casing comprises at least one reinforcement that holds at least two of the PTC element, the conductor paths, and the insulating layers in a prestressed manner in abutment against each other in the casing.

3. The PTC heating element according to claim 2, wherein the reinforcement is formed by a spherical configuration of oppositely disposed main side walls of the casing, the inner surfaces of which, in a cross-sectional view of the casing, are flat and bear against the PTC element and which are thicker at the center of the PTC element than at the edge of the PTC element.

4. The PTC heating element according to claim 1, further comprising a ground connection strip electrically connected to the casing.

5. The PTC heating element according to claim 1, further comprising a seal element that is made of a resiliently soft plastic material, that seals an opening of the casing, and that has passage openings aligned with the contact strips.

6. The PTC heating element according to claim 5, wherein the seal element projects over the casing in the direction of a longitudinal extension of the contact strips.

7. The PTC heating element according to claim 5, wherein the casing forms a holding edge holding the seal element.

8. The PTC heating element according to claim 5, further comprising a passage element which is made of an electrically insulating material, which is inserted into a free end of the casing that is penetrated by the contact strips, and which forms passage channels for the contact strips.

9. The PTC heating element according to claim 1, wherein the casing comprises a deep drawn part.

10. The PTC heating element according claim 9, wherein a holding rib is provided opposite to the contact strips and is formed by the deep drawn part.

11. A PTC heating element for an electric heating device, comprising:

a casing that joins, as a unit, at least one PTC element, conductor paths that are electrically connected to the PTC element, and insulating layers that bear against the PTC element in a heat-conductive manner; and contact strips which project over the PTC element and which are electrically conductively connected to the conductor paths for energizing the PTC element with different polarities; wherein the casing comprises at least one reinforcement that holds at least two of PTC element, conductor path, and insulating layer in a prestressed manner in abutment against each other in the casing; and wherein the at least one reinforcement is formed by a spherical configuration of oppositely disposed main side walls of the casing, the inner surfaces of which, in a cross-sectional view of the casing, are flat and bear against the PTC element and which the main side walls, in a cross-sectional view of the casing, are thicker at the center of the PTC element than at the edge of the PTC element.

12. The PTC heating element according to claim 11, wherein the casing forms a receptacle space that receives the PTC element, the conductor paths, and the insulating layers, wherein the receptacle space, in a cross-sectional view, is defined by two oppositely disposed flat inner surfaces covering the PTC element, deformation segments adjoining the inner surfaces, and outer longitudinal edges of the casing, and wherein the deformation segments are provided, in a cross-sectional view, between one of the inner surfaces and the associated outer longitudinal edge, and wherein the deformation segments are plastically deformed in the direction towards the receptacle space and opposite the inner surfaces and the outer longitudinal edges of the casing.

13. An electric heating device comprising:

at least one PTC heating element arranged in a circulation chamber, the PTC heating element including a casing that joins, as a unit, at least one PTC element, conductor paths that are electrically connected to the PTC element, and insulating layers that bear against the PTC element in a heat-conductive manner, wherein the casing has contact strips which project over itself and which are electrically conductively connected to the conductor paths for energizing the PTC element with different polarities, wherein the casing forms a receptacle space that receives the PTC element, the conductor paths, and the insulating layers, wherein the receptacle space, in a cross-sectional view, is defined by two oppositely disposed flat inner surfaces covering the PTC element, deformation segments adjoining the inner surfaces, and outer longitudinal edges of the casing, wherein the deformation segments are provided, in a cross-sectional view, between one of the inner surfaces and the associated outer longitudinal edge, and wherein the deformation segments are plastically deformed in the direction towards the receptacle space opposite the inner surfaces and the outer longitudinal edges of the casing, and perpendicular to the flat inner surfaces of the receptacle face.

* * * * *